United States Patent
Freeman et al.

(10) Patent No.: US 7,243,205 B2
(45) Date of Patent: Jul. 10, 2007

(54) BUFFERED MEMORY MODULE WITH IMPLICIT TO EXPLICIT MEMORY COMMAND EXPANSION

(75) Inventors: Chris B. Freeman, Portland, OR (US); Pete D. Vogt, Boulder, CO (US); Kuljit S. Bains, Olympia, WA (US); Robert M. Ellis, Hillsboro, OR (US); John B. Halbert, Beaverton, OR (US); Michael W. Williams, Citrus Heights, CA (US)

(73) Assignee: Intel Corporation, Santa Clara, CA (US)

( * ) Notice: Subject to any disclaimer, the term of this patent is extended or adjusted under 35 U.S.C. 154(b) by 579 days.

(21) Appl. No.: 10/713,784

(22) Filed: Nov. 13, 2003

(65) Prior Publication Data

US 2005/0108469 A1    May 19, 2005

(51) Int. Cl.
  *G06F 12/00*    (2006.01)
(52) U.S. Cl. ........................ 711/200; 711/105
(58) Field of Classification Search ............ None
  See application file for complete search history.

(56) References Cited

U.S. PATENT DOCUMENTS

| | | |
|---|---|---|
| 6,185,644 B1 | 2/2001 | Farmwald et al. |
| 6,317,352 B1 | 11/2001 | Halbert et al. |
| 6,345,321 B1 | 2/2002 | Litaize et al. |
| 6,369,605 B1 | 4/2002 | Bonella et al. |
| 6,493,250 B2 | 12/2002 | Halbert et al. |
| 6,502,161 B1 | 12/2002 | Perego et al. |
| 6,523,098 B1 * | 2/2003 | Anderson .................. 711/158 |
| 6,625,687 B1 | 9/2003 | Halbert et al. |
| 6,643,752 B1 | 11/2003 | Donnelly et al. |
| 6,820,087 B1 * | 11/2004 | Langendorf et al. ........ 707/101 |
| 7,062,597 B2 * | 6/2006 | Perego et al. .................. 711/5 |
| 2005/0262295 A1 * | 11/2005 | Nataraj et al. .............. 711/108 |

FOREIGN PATENT DOCUMENTS

| | | |
|---|---|---|
| WO | WO 99/30240 | 6/1999 |
| WO | WO 99/41666 | 8/1999 |
| WO | WO 99/41667 | 8/1999 |

OTHER PUBLICATIONS

SBS Implementers Forum; *System Management Bus Specification*; Aug. 3, 2000; pp. 1-59.
Atmel Corporation; *2-Wire Serial EEPROM Revision 0180D*; Oct. 1998; pp. 1-21.
Intel Corporation; *PC SDRAM Serial Presence Detect Specification Revision 1.2B*; Nov. 1999; pp. 1-30.

* cited by examiner

*Primary Examiner*—Reginald Bragdon
*Assistant Examiner*—Ngoc Dinh
(74) *Attorney, Agent, or Firm*—Philip A. Pedigo

(57) ABSTRACT

Method and apparatus for use with buffered memory modules are included among the embodiments. In exemplary systems, the memory module has a buffer that receives memory commands and data, and then presents those commands and data to physical memory devices through a separate interface. The buffer has the capability to accept an implicit memory command, i.e., a command that does not contain a fully-formed memory device command, but instead instructs the memory module buffer to form one or more fully-formed memory device commands to perform memory operations. Substantial memory channel bandwidth can be saved, for instance, with a command that instructs a memory module to clear a region of memory or copy a region to a second area in memory. Other embodiments are described and claimed.

15 Claims, 4 Drawing Sheets

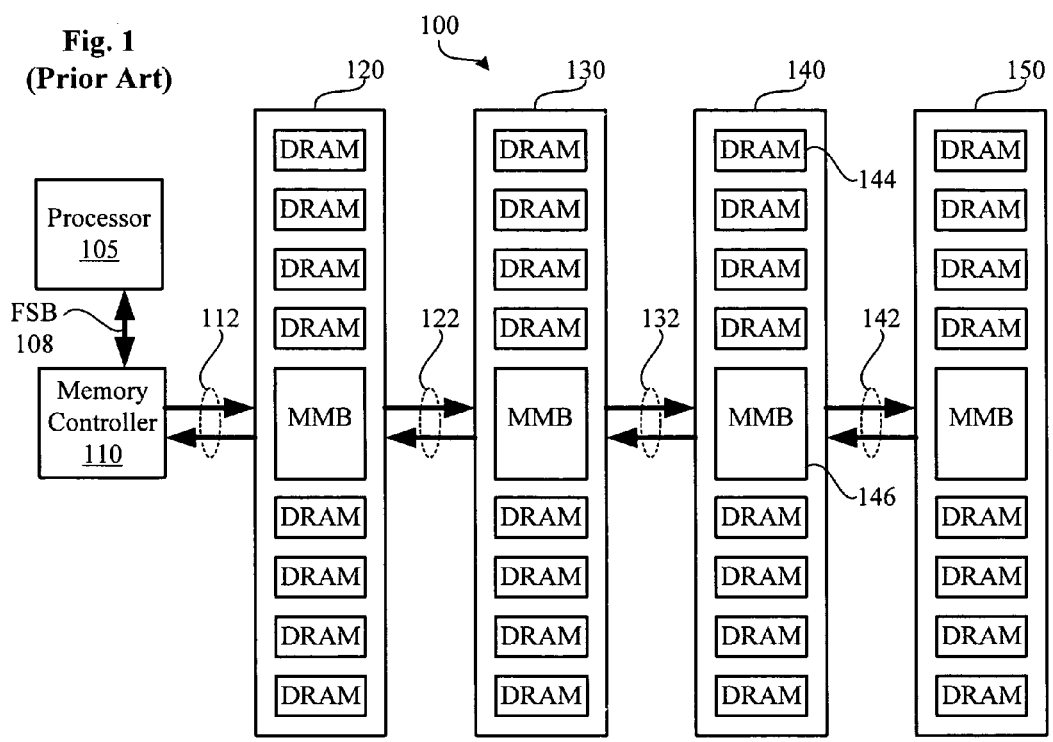
Fig. 1
(Prior Art)
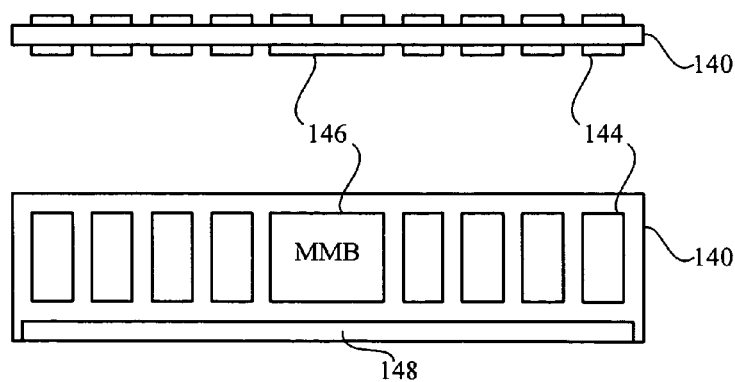
Fig. 2a
(Prior Art)
Fig. 2b
(Prior Art)

BUFFERED MEMORY MODULE WITH IMPLICIT TO EXPLICIT MEMORY COMMAND EXPANSION

FIELD OF THE INVENTION

This present invention relates generally to memory systems, components, and methods, and more particularly to functionality for buffered memory modules that can expand implicit commands into explicit commands directed at memory devices on the memory module.

BACKGROUND

Conventional computer memory subsystems are often implemented using memory modules. A computer circuit board is assembled with a processor having an integrated memory controller, or coupled to a separate memory controller, connected by a memory bus to one or more memory module electrical connectors (the bus may also connect to additional memory permanently mounted on the circuit board). System memory is configured according to the number of and storage capacity of the memory modules inserted in the electrical connectors.

As processor speeds have increased, memory bus speeds have been pressured to the point that the multi-point (often referred to as "multi-drop") memory bus model no longer remains viable. Referring to FIG. 1, one current solution uses a "point-to-point" memory bus model employing buffered memory modules. In FIG. 1, a computer system 100 comprises a host processor 105 communicating across a front-side bus 108 with a memory controller 110 that couples the host processor to various peripherals (not shown except for system memory). Memory controller 110 communicates with a first buffered memory module 120 across a high-speed point-to-point bus 112. A second buffered memory module 130, when included in system 100, shares a second high-speed point-to-point bus 122 with first memory module 120. Additional high-speed point-to-point buses and buffered memory modules, such as buses 132 and 142 and memory modules 140 and 150, can be chained behind memory module 130 to further increase the system memory capacity.

Buffered memory module 140 is typical of the memory modules. A memory module buffer (MMB) 146 connects module 140 to a host-side memory channel 132 and a downstream memory channel 142. A plurality of memory devices (Dynamic Random Access Memory Devices, or "DRAMs" like DRAM 144, are shown) connect to memory module buffer 146 through a memory device bus (not shown in FIG. 1) to provide addressable read/write memory for system 100.

FIGS. 2a and 2b show, respectively in top and side view, one possible physical appearance for a Dual In-line Memory Module (DIMM) embodiment of memory module 140. A set of card edge connectors 148 provide electrical connection for host-side and downstream memory channels, reference and power supply voltages, clock signals, etc. MMB 146 is centrally located on one side of module 140, flanked on each side by four DRAM devices 144. Ten more DRAM devices occupy the opposite side of module 140. MMB 146 conducts all memory transactions with the DRAMs.

As an exemplary memory transfer, consider a case in which processor 105 needs to access a memory address corresponding to physical memory located on memory module 140. A memory request is issued to memory controller 110, which then sends a command, addressed to memory module 140, out on host memory channel 112. The MMB of buffered memory module 120 receives the command, retimes it, if necessary, and resends it on memory channel 122 to the MMB of buffered memory module 130. The MMB of buffered memory module 130 next receives the command, retimes it, if necessary, and resends it on memory channel 132 to MMB 146 on memory module 140. MMB 146 detects that the command is directed to it, decodes it, and transmits a DRAM command and signaling to the DRAMs controlled by that buffer.

When the command issued by memory module 140 is a write command, the command includes a write address and is accompanied by the data to be written to that address. The data is of the same "width" as the memory, where width represents the number of bits of data that are stored when a write to a single address is initiated. When the command issued by memory module 140 is a read command, the command includes a read address, and the memory module is expected to return data read from the read address a few clock cycles later.

Some DRAMs and module buffers support "burst write" and "burst read" operations. When a burst-operation-capable DRAM receives a burst operation, the write or read address is defined to be the starting address for a multi-cycle operation. For instance, in a four-memory-width burst write, write data is supplied to the module DRAMs during four successive clock cycles, and each DRAM is expected to store the write data in four successive addresses beginning with the write address. In a four-memory-width burst read, each DRAM reads data from four successive addresses and transmits the data during four successive clock cycles. In both cases, buffer 146 must comprehend the burst length in order to appropriately direct burst data between its DRAMs and host-side memory channel 132.

BRIEF DESCRIPTION OF THE DRAWING

The embodiments may be best understood by reading the disclosure with reference to the drawing, wherein:

FIG. 1 illustrates a prior art computer system;

FIGS. 2a and 2b illustrate the physical appearance of a fully buffered Dual Inline Memory Module (DIMM);

DETAILED DESCRIPTION OF THE EMBODIMENTS

This description details various computer systems, memory components, and methods for implementing "implicit" memory commands using a buffered memory subsystem. Prior art memory access commands can be characterized as "explicit" memory commands, in that each command contains full addressing and explicit data expected by a DRAM (if the command is one in which data is expected). Even though it could be argued that a burst operation contains implicit addressing for all but the first memory-width of data, this addressing is explicit because it is a fully-formed DRAM command. In the context of the present application, an "implicit" command does not contain a fully-formed DRAM command, but is instead a command directed to a memory module buffer, instructing the memory module buffer to form one or more fully-formed DRAM commands to perform memory operations.

The buffered memory architecture can be exploited in this manner to improve system performance for many tasks. In FIG. 1, memory channel 112 and/or front-side bus 108 often become the bottleneck to increased performance. When the number of relatively trivial transactions occupying memory channel 112 and processor 105 is reduced, additional capacity is opened for less trivial tasks. For example, many applications allocate a block of memory and expect that memory to be set to a certain state, e.g., all zeros. If a memory buffer can be instructed once to set the memory block to the zero state and be trusted to do that, the processor does not need to loop through the block in software, writing zeros to each location in the block. The processor and host memory channel can move on to more complex or varied tasks, including using the memory channel to access other memory modules.

Another common operation is a block copy of data from one memory location to another. If the processor is required to perform this operation "manually," each data word must traverse host memory channel 112 twice. In some embodiments of the present invention, however, a block copy that has copy-from and copy-to addresses on the same memory module need not occupy the host memory channel at all—if the buffer on that module can accept a few copy parameters and then replicate the data itself.

Many other examples of implicit commands useful with embodiments of the present invention exist, some of which will be explored further nearer the end of the disclosure. These two examples, however, are sufficient for an understanding of the hardware embodiments that will now be presented.

Figure 3:
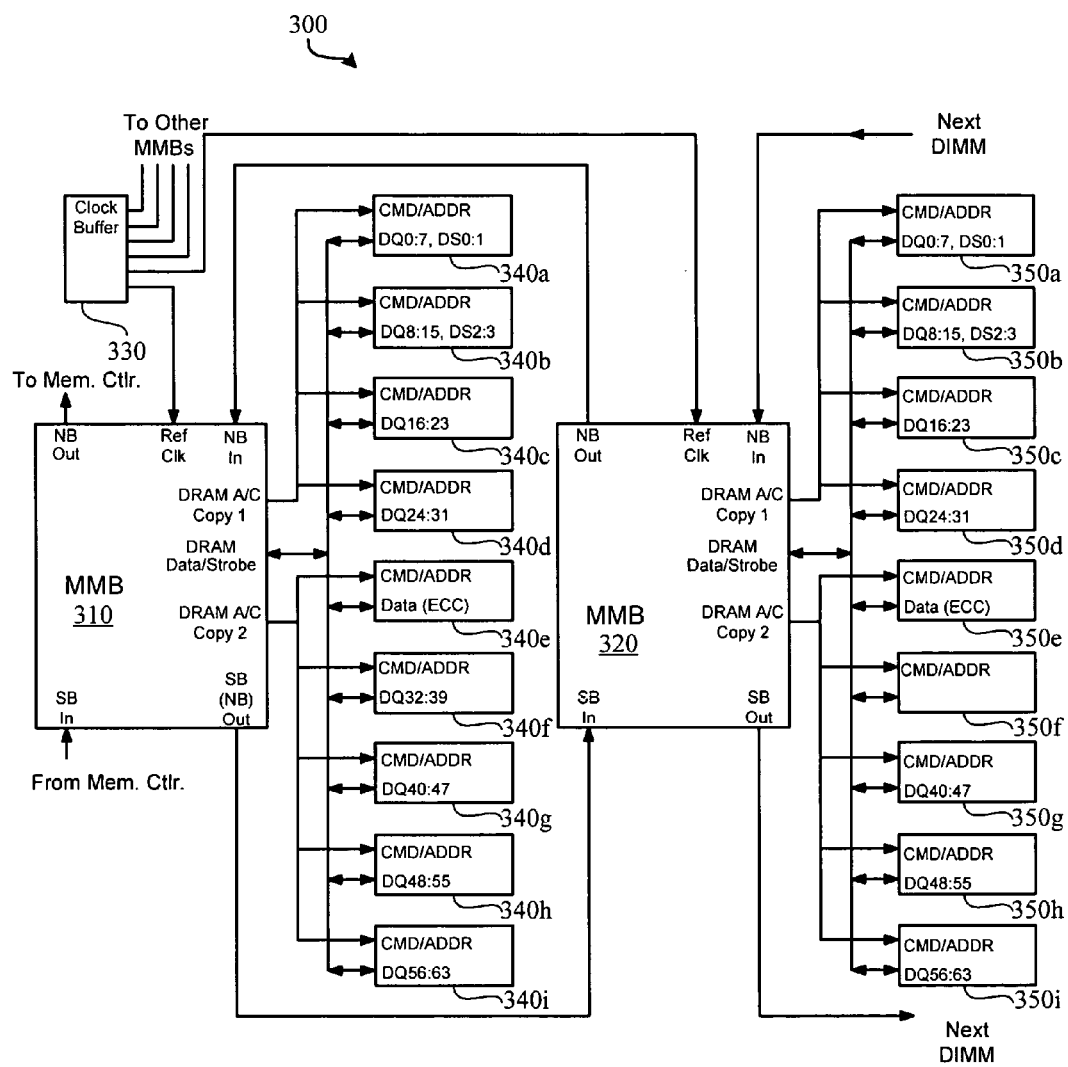
FIG. 3 schematically depicts two memory module buffers connected with two respective banks of memory devices.
Figure 4:
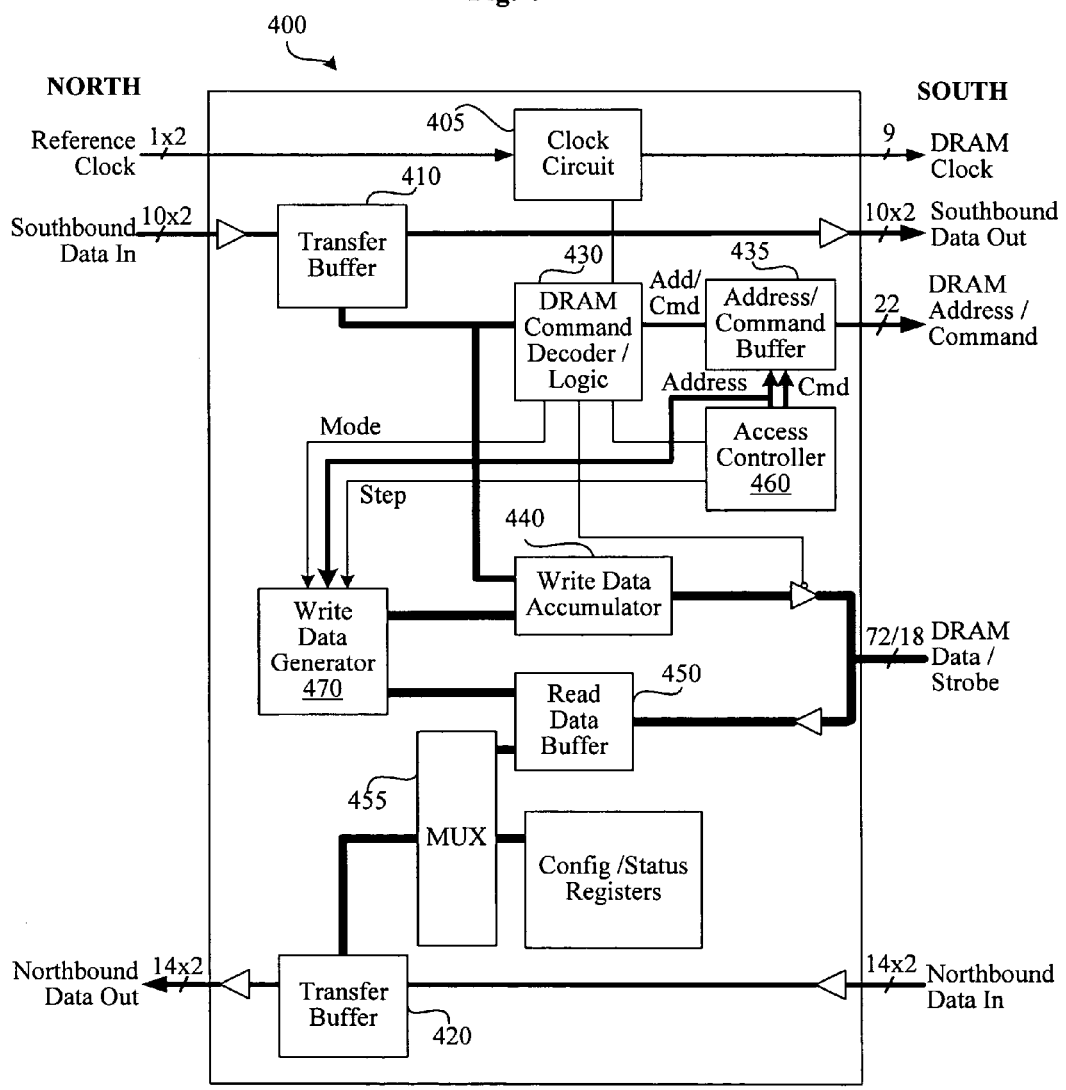
FIG. 4 shows the internal architecture of a memory module buffer according to an embodiment of the present invention.

FIG. 3 shows a general electrical schematic 300 for a partial memory subsystem configuration capable of utilizing MMBs such as MMB 400 of FIG. 4. One MMB 310 connects through its host-side memory channel (SB In and NB Out) to a memory controller. A second MMB 320 connects through a second memory channel to MMB 310 (NB Out of MMB 320 connects to NB In of MMB 310, and SB Out of MMB 310 connects to SB In of MMB 320). Other MMBs (not shown) can be connected downstream of MMB 320.

A clock buffer 330 creates multiple replicas of a clock reference, one for each MMB, and supplies each to the Ref Clk input of a respective MMB.

MMB 310 connects to a bank of memory devices 340a–340i. Two copies of the DRAM Address/Command signals are made to alleviate bus loading problems. Copy 1 is distributed to memory devices 340a–340d, and Copy 2 is distributed to memory devices 340e–340i. A portion of the DRAM Data/Strobe signal bus is routed to each memory devices. For instance, as shown, DQ0:7 and DS0:1 (Data bits 0 to 7 and data strobes 0 and 1) are routed to memory device 340a, DQ8:15 and DS1 are routed to memory device 340b, etc. Memory device 340e receives eight bits of ECC (Error Correction Circuitry) data corresponding to the data supplied on DQ0:63.

As can be appreciated from FIG. 3, MMB 310 has sole access to the signal paths connected to memory devices 340a–340i, and MMB 320 has sole access to the signal paths connected to memory devices 350a–350i. Thus in principle, either—or both—MMBs are capable of conducting memory transactions with their respective memory devices while other traffic flows on the Southbound/Northbound memory channels.

FIG. 4 shows a block diagram for a memory module buffer 400 according to some embodiments of the present invention. Memory module buffer 400 maintains a substantial number of external connections. Host-side connections to MMB 400 include a reference clock differential pair input port and a memory channel port for up to twenty-four differential pairs, e.g., ten southbound data input and fourteen northbound data output. Downstream connections include a corresponding number of differential pairs, e.g., ten for southbound data output and fourteen for northbound data input. Memory device connections include a 22-bit-wide DRAM address/command channel, memory device clocking signals, and a 72-bit-wide DRAM data bus with 18 bits of data strobe signaling. Various buffers, flip-flops, receivers, and drivers facilitate signaling on these connections, although not all are shown explicitly, and further description of these circuit elements is omitted as not critical to the understanding of the embodiments. For instance, a clock circuit 405 contains phase-locked loops, clock replicators and drivers, etc., but such circuitry is no different from that used in the prior art.

The remainder of the numbered functional blocks will each be described in turn.

A transfer buffer 410 normally receives data from the host-side memory channel port and repeats that data out on the downstream memory channel port. In this example, the memory channel ports are considerably narrower than the DRAM address/command port and the DRAM data port (the clock rate on the narrow memory channels, however, is much higher than the clock rate on the DRAM ports). Accordingly, transfer buffer 410 de-multiplexes commands and data traveling along the southbound memory channels. A second transfer buffer 420 performs a similar repeat function for northbound data, and merges data from multiplexer 455 into the northbound data channel when a read has been requested.

A DRAM command decoder/logic block 430 receives addresses and commands from transfer buffer, and determines if each command was directed at buffer 400 or at some other buffer. When a command is directed at buffer 400, DRAM command decoder/logic block 430 can initiate appropriate signaling on the DRAM channels to perform the requested command. For instance, if the command is an explicit write command, block 430 directs a write data accumulator 440 to receive write data from transfer buffer 410, loads the write address and command to an address/command buffer 435, and times driving of the write address and write data to the DRAM devices. For an explicit read command, the read address and command are driven to the DRAM devices, and a read data buffer 450 and multiplexer 455 are enabled to transfer the read data back to the memory controller.

Since buffer 400 already supplies addresses, commands, and write data to the DRAM devices, and reads data from the DRAM devices, all with the correct timing, this functionality can be leveraged to supply addresses, commands, and/or data from a location other than the southbound data in port. An access controller 460 and a write data generator 470 are added in this embodiment to supply such alternate sources of DRAM signaling content.

Implicit commands are processed as follows. DRAM command decoder/logic 430 decodes a command and notes that it is an implicit command. If the implicit command will involve a write operation, a write data generation mode is signaled to write data generator 470. Parameters necessary for access controller 460 to generate explicit addresses and/or commands, as needed, are passed to access controller 460. Access controller 460 generates appropriate explicit addresses and/or commands, and sends step signals to write data generator 470 when more than one explicit transaction is to be generated.

Figure 5:
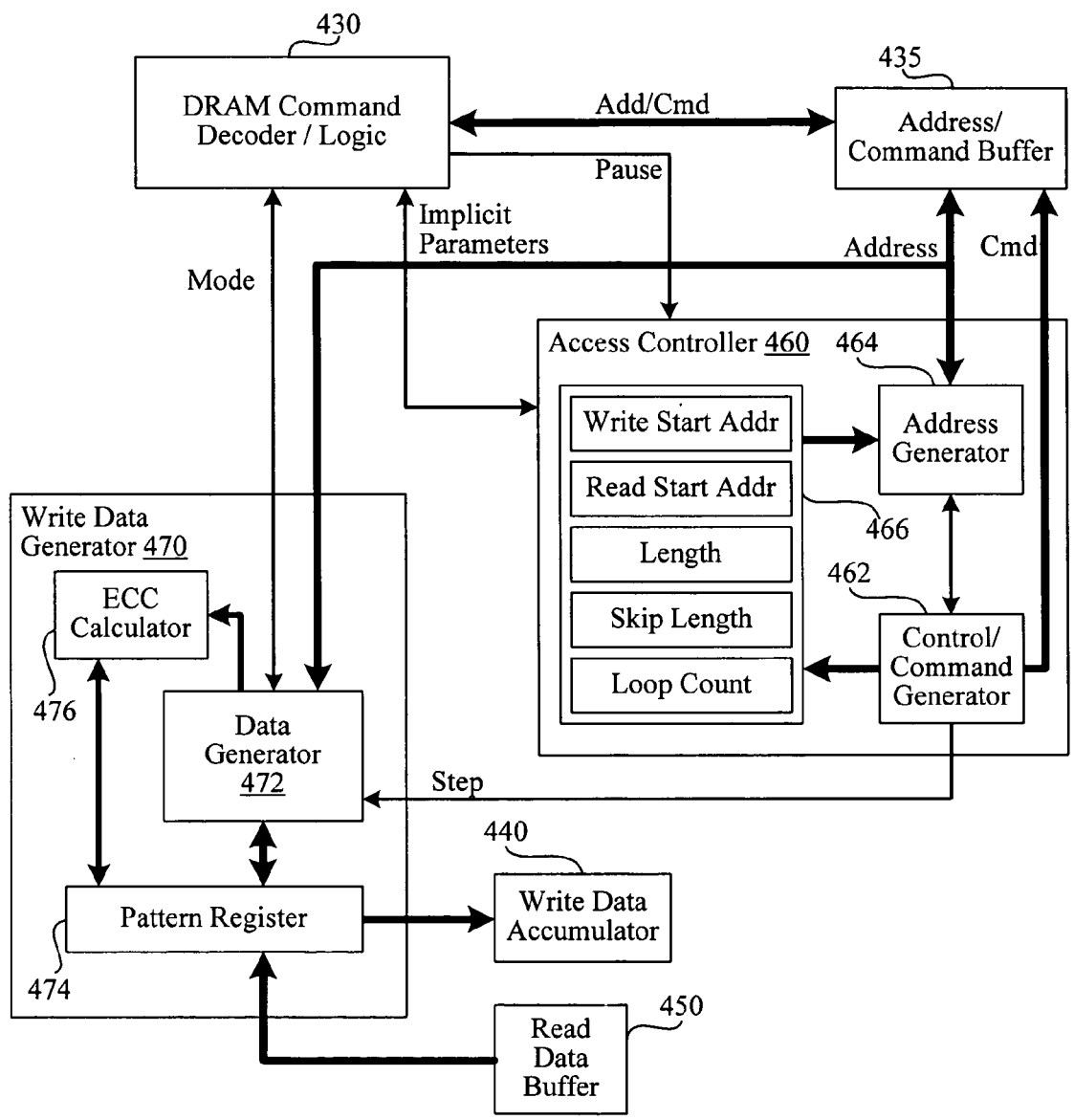
FIG. 5 shows memory module buffer circuitry capable of responding to implicit memory commands.

FIG. 5 contains further detail for access controller 460 and write data generator 470 according to some embodiments. Turning first to access controller 460, internal components including a control/command generator 462, an address generator 464, and a parameter register 466 are illustrated. Control/command generator 462 determines from the decoded implicit command what parameters will be received, and writes those parameters to appropriate locations in parameter register 466 as they are supplied by DRAM command decoder/logic 430. Control/command generator 462 also triggers address generator 464 to generate addresses, supplies the appropriate explicit command to address/command buffer 435, and signal DRAM command decoder/logic 430 to drive commands to the DRAM devices with the appropriate timing.

Address generator 464 receives resets and step signals from control/command generator, and generates addresses based on the parameters stored in parameter register 466. Generally, address generator 464 functions as an address counter, although more sophisticated addressing functions will be explained below.

Parameter register 466 stores whatever parameters are needed for a pending implicit command. Write start address, read start address, length, skip length, and loop count parameters are shown. Some implicit commands could require other parameters, and many require only a subset of those shown. Other variables, such as a current read and/or write address, can be maintained in the address generator or stored in register 466.

Write data generator 470 preferably comprises a data generator 472, a pattern register 474, and an ECC (Error Correction Code) calculator 476. When an implicit write command is pending, DRAM command decoder/logic 430 supplies a Mode to data generator. For some commands, the Mode could be accompanied by an explicit write data value or pattern. Other modes will instruct data generator 472 as to where to find, and/or how to calculate, such a data value or pattern.

Pattern register 474 preferably stores at least one memory data-width worth of write data, and may store much more in some embodiments. The pattern register can receive data from many sources, including data generator 472, ECC calculator 476, read data buffer 450, or possibly even itself in a looping mode. Pattern register 474 can be configured as a First-In First-Out (FIFO) that steps in response to the Step signal from access controller 460.

ECC calculator 476 is particularly useful in memory systems that store ECC data as part of every write operation to allow detection and correction of errors. The availability of ECC calculator 476 allows data generator 472 to form valid memory words when the manner in which write data is generated does not allow the host to calculate an ECC value.

Several implicit commands will now be explained to illustrate how the embodiment of FIG. 5 can be used to generate explicit memory commands. The first example is the initialization function described previously. An implicit InitializeMemory command supplies a Write Start Address, a Length, and an Initialization Value. The Initialization Value is passed to data generator 472, which writes the value to Pattern Register 474. The Write Start Address and Length are written to parameter register 466, and address generator 464 is initialized to the Write Start Address. Address generator 464 supplies an address to address/command buffer 435, control/command generator 462 supplies an explicit write command to address/command buffer 435, and pattern register 474 supplies the Initialization Value to write data accumulator 440. DRAM command decoder/logic 430 then drives the write command to the memory devices.

Address generator 464 increments to the next address, and the cycle is repeated, until Length addresses have been initialized.

Several variations on the InitializeMemory commands are presented. For instance, some commands can refer to an initialization value already known to the buffer, such as an InitializeMemoryZero command, which would signal a Mode to data generator 472 that causes the generator to create a zero data value, or an InitializeMemoryOnes command that would do the opposite. Patterns can also be created, i.e., InitializeMemoryCheckers that would cause data generator 472 to alternately place all zeros and all ones in pattern register 474. Instead of "ones" and "zeros," the values could be supplied from a configuration register, from a memory read, or in the command itself. A longer pattern could also be specified with a specified pattern length and pattern that is to be repeated.

An InitializeMemoryCountUp command can cause data generator 472 to increment an integer starting value for each successive memory location (by one or by a specified amount), or to base the data value on the address currently generated by address generator 464.

An InitializeMemoryRegions command can be combined with any of the above concepts to set a non-contiguous block of addresses. The parameters Skip Length and Loop Count are supplied, such that after Length addresses are written, the Address Generator skips forward by Skip Length addresses and again writes Length addresses, until it has done this Loop Count times. Such a function could be useful, e.g., in image rendering to set the color of a vertical stripe, or in a spreadsheet or database table to clear a column of the table.

Alternately, two or more subranges with different lengths and unrelated starting addresses could be supplied as part of the same implicit command.

Likewise, a ReadMemoryRegions command can accomplish the same thing with a read command, allowing selected data regions, related or unrelated, to be read in a single operation.

A ReadMemoryBlock command can indicate that Length contiguous memory addresses are to be read. Although functionally similar to an explicit burst read command, such a command could be used to read a varied range of desired lengths of memory blocks, even some considerably longer than those allowed by a burst read. Such an implicit command could even be implemented inside the buffer to use multiple explicit burst read commands.

The reading and writing implicit functions described above can be combined in some embodiments to form a command such as a CopyMemoryBlock command. This command can cause control/command generator 462 to switch between read and write contexts, alternately reading data through read data buffer 450 into pattern register 474 and then writing that data from pattern register 474 to write data accumulator 440 in order to replicate one region of memory in another region. If the read data is specified with a smaller size, the command can be set to repeat the read data into the write block until the write block is full.

Many other commands and options are possible. For instance, a mask can be supplied to enable a partial-data-width initialization in a region of memory. A "pause"

function can be implemented from DRAM command decoder/logic 430, as shown in FIG. 5. When an implicit initialize or copy command is executing and a second, explicit memory command is received, DRAM command decoder/logic 430 sets the Pause signal while it performs the explicit memory access requested by the host. Subsequently, the Pause signal is deasserted to allow what is essentially a "background" operation to proceed. Of course, it would likely be up to the host to ensure that unpredictable results would not result from such a pause operation. A cancel function could likewise be implemented.

One approach for preventing unpredictable results could be to store a status value in a completion register that is accessible from the host-side memory channel port. The host can then check the progress of a pending implicit memory command before issuing a potentially conflicting command. A simple completion register can be set to indicate "pending" when a new implicit command is received, and then set to "complete" when the command is completed. Alternately, the address generator value could be supplied to indicate how much progress has been made so far in processing an implicit command.

A computer language compiler or interpreter, an executable program, or a runtime library can be designed to take advantage of implicit memory commands, when such are available, by forming an implicit memory command to process simple data manipulation loops. When the resulting code is executed, implicit memory commands are transmitted to a buffered memory module for expansion into the explicit memory commands that would otherwise have been executed in some looping fashion by the host processor.

Many desirable software techniques can be implemented with low overhead using some of the described embodiments. For instance, in a dynamic memory system where memory blocks are allocated to processes as needed and deallocated when not needed, an implicit ClearMemoryBlock command can be initiated by the operating system whenever memory is deallocated, such that potentially sensitive data is not left in physical memory when that data is released by a program.

One of ordinary skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. For instance, the described functions can cooperate with, or be part of, a memory Built-In Self Test function. Explicit addresses and commands generated in the buffer can be passed directly to a DRAM command decoder/logic block for sequencing. The functionality exemplified by the described embodiments need not all exist in any one embodiment. Likewise, many other implicit memory commands are possible using the broad concepts taught herein. This description is not meant to be a catalog of all possible implicit commands.

Many of the specific features shown herein are design choices. The functional blocks and signals described herein are all merely presented as examples. Likewise, functionality shown embodied in a single integrated circuit may be implemented using multiple cooperating circuits, or vice versa. Channel and bus widths, signaling frequencies, DIMM layouts, number of memory devices, control bus protocols, etc., are all merely presented as examples. DIMMs can have multiple ranks of memory and/or memory modules stacks of multiple devices. Such minor modifications are encompassed within the embodiments of the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A memory module buffer comprising:
 a host-side memory channel port and a memory device channel port;
 a command decoder to decode commands received at the host-side memory channel port, the commands including at least one implicit command type, wherein the at least one implicit command type includes at least one implicit write command with a command format that specifies a first region of memory to be written to and includes less explicit write data than would be needed to fill the region of memory, the buffer further comprising a write data generator to form implicit write data in accordance with the implicit write command and further wherein the at least one implicit write command includes a copy command specifying a second region of memory to be read from to form the implicit write data, the memory device access controller responding to the copy command by causing the buffer to read data from the second region of memory to form the implicit write data; and
 a memory device access controller to respond to a command having an implicit command type by generating at least one explicit memory access command to the memory device channel port.

2. The memory module buffer of claim 1, wherein when the second region of memory is smaller in size than the first region of memory, the write data generator forms implicit write data by repeating at least some data from the second region of memory.

3. The memory module buffer of claim 1, wherein the at least one implicit write command includes a command comprising a data value, and wherein the write data generator forms implicit write data by repeating the data value for multiple addresses throughout the first region of memory.

4. The memory module buffer of claim 1, wherein the at least one implicit write command includes a command indicating that a predefined pattern is to be written to the first region of memory, and wherein the write data generator forms implicit write data by repetitively generating the predefined pattern.

5. The memory module buffer of claim 4, further comprising a pattern register coupled to the write data generator to store the predefined pattern.

6. The memory module buffer of claim 4, wherein the predefined pattern is at least partially dependent on the address being written to, and wherein the write data generator forms implicit write data using at least a portion of the address being written to.

7. The memory module buffer of claim 1, wherein the at least one implicit write command includes a command having a format capable of specifying the first region of memory as a non-contiguous region of multiple disconnected sub regions, the memory device access controller having a capability to direct writing to each of the multiple disconnected sub regions in turn.

8. The memory module buffer of claim 7, wherein the memory device access controller having the capability to respond to a command format specifying a start address, write length, skip length, and number of sub regions, by repetitively writing data to a range of addresses equal to the write length and skipping a range of addresses equal to the skip length, until a number of sub regions equal to a specified number of sub regions has been written.

9. The memory module buffer of claim 1, wherein the write data generator comprises an error correction code generator capable of generating an error correction code as part of the implicit write data word.

10. The memory module buffer of claim 1, wherein the memory device channel port having a data width, the buffer further comprising a data mask generator to mask a portion of a data width during writes responsive to the implicit command type when the implicit command specifies a partial-width write command.

11. The memory module buffer of claim 1, further comprising a pause function activated by the command decoder when a second command requiring access to the memory device channel port is received during activity related to a first command of the implicit command type, the memory device access controller responding to the pause function by pausing execution of the first command while the second command executes.

12. The memory module buffer of claim 1, further comprising a completion register that the memory module buffer sets to indicate a status of a pending command with the implicit command type, wherein a value stored in the completion register is accessible from the host-side memory channel port.

13. The memory module buffer of claim 1, wherein the memory device access controller having the capability to respond to a command format specifying a start address, read length, skip length, and number of sub regions, by repetitively reading data from a range of addresses equal to the read length and skipping a range of addresses equal to the skip length, until a number of sub regions equal to a specified number of sub regions has been read.

14. A buffered memory module comprising:
a plurality of memory devices; and
a buffer connected to the memory devices and having
a host-side memory channel port,
a command decoder to decode commands received at the host-side memory channel port, the commands including at least one implicit command type, and
a memory device access controller to respond to a command having an implicit command type by generating and transmitting at least one explicit memory access command to the memory devices, the memory device access controller having a capability to respond to a command format specifying a start address, read length, skip length, and number of sub regions, by repetitively reading data from a range of addresses equal to the read length and skipping a range of addresses equal to the skip length, until a number of sub regions equal to a specified number of sub regions has been read from the memory devices.

15. The buffered memory of claim 14, wherein the at least one implicit command type includes at least one implicit write command with a command format that specifies a first region of memory to be written to and includes less explicit write data than would be needed to fill the region of memory, the buffer further comprising a write data generator to form implicit write data in accordance with the implicit write command.

* * * * *